March 4, 1924.
G. W. PETERSON
ENGINE VALVE
Filed Sept. 11, 1922    3 Sheets-Sheet 3
1,485,625
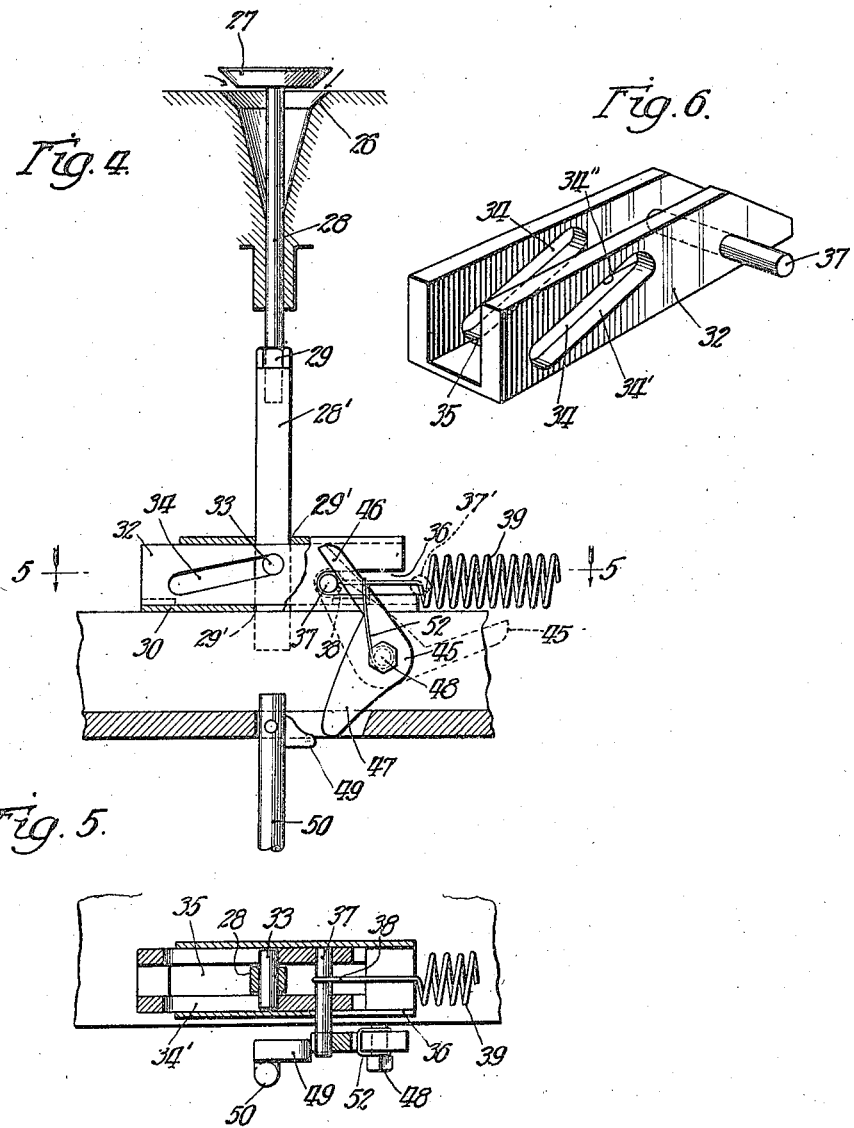

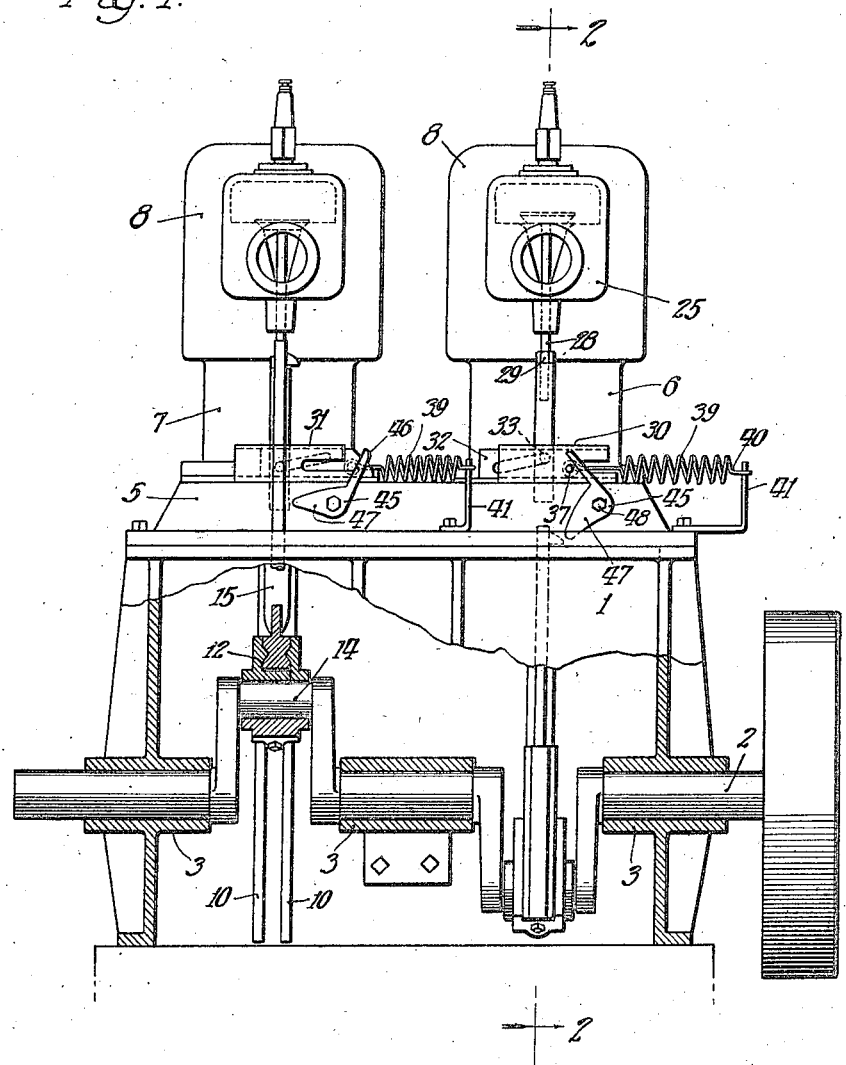

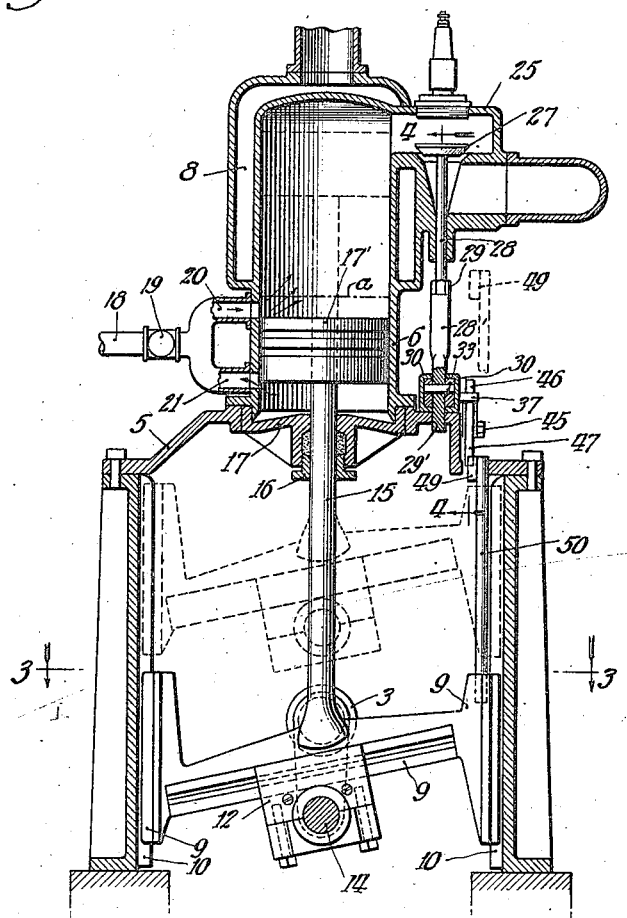
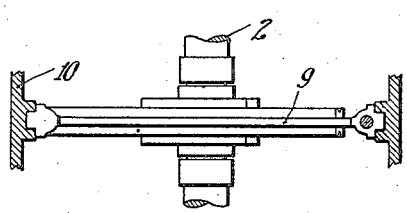

Patented Mar. 4, 1924.

1,485,625

UNITED STATES PATENT OFFICE.

GEORGE W. PETERSON, OF CHICAGO, ILLINOIS, ASSIGNOR OF ONE-FOURTH TO CLAUDE DYCKMAN, ONE-FOURTH TO RUDOLPH W. SCHROEDER, AND ONE-FOURTH TO PATRICK J. O'KEEFFE, ALL OF CHICAGO, ILLINOIS.

ENGINE VALVE.

Application filed September 11, 1922. Serial No. 587,331.

*To all whom it may concern:*

Be it known that I, GEORGE W. PETERSON, a citizen of the United States, residing at the city of Chicago, in the county of Cook and State of Illinois, have invented certain new and useful Improvements in Engine Valves, of which the following is a specification.

My invention relates to valves by which the cylinder ports of high-speed motors are closed and by which the movement of actuating gases or fluids therethrough are controlled. It is one object of my invention to cause the valve movement to be accurately synchronized with the movement of the piston and to cause the valve to be opened by positive mechanical means, at a predetermined point of piston movement, against the pressure of expanded gases in the cylinder, thus enabling the port to be enlarged to any desired practical size to expedite the movement of gases therethrough. Another object of my invention is to effect a rapid and practically instantaneous closing of the valve by spring action whereby the seating of the valve is accommodated to variations of temperature and by which the valve when so seated, is held in its seat by positive mechanical means. It is a further object to cause the valve, at all times, to be controlled by positively applied mechanical means which will forestall vibratory movement of the valve and hold the valve in its seat without vibration or chatter.

The principles of my invention are illustrated in the drawings in which Fig. 1 is a side elevation partly in section of a two-cycle engine. Fig. 2 is a vertical section on the line 2—2 of Fig. 1. Fig. 3 is a horizontal section on the line 3—3 of Fig. 2. Fig. 4 is an enlarged detail of my improved valve and its actuating mechanism. Fig. 5 is a section on the line 5—5 of Fig. 4. Fig. 6 is an enlarged perspective of the valve actuating block.

Further describing my invention with reference to the drawings in which like characters of reference denote like parts throughout: Numeral 1 indicates the base of a two-cycle engine in which the crank shaft 2 is mounted in bearings 3. 5 is a bridge or housing secured to the top of said base upon which are mounted the cylinders 6 and 7 having water jackets 8. Cross-heads 9 move on guides 10. A sliding bearing block 12 is adapted to lateral movement on the cross-head and receives the crank pin 14 of the crank shaft 2. A piston rod 15 passes through the gland 16 in the lower and removable heads 17 of the cylinders. The piston heads 17' in the said cylinders move alternately in accordance with their relative attachment to the cranks of the crank shaft. Gas is introduced through pipe 18 and check valve 19 whence it passes to ports 20 and 21 by which it is led into the lower part of the cylinder. It is there compressed on the down or power stroke of the piston and thence transferred to the upper part of the cylinder when port 20 is disclosed by the passage of the piston head as shown in Fig. 2. In the laterally extended portion 25 forming the L-head, is the outlet port having seat 26 which receives the valve head 27.

The stem 28 passes downwardly through the cylinder casing and may have the extended portion 28' to which it is screw-threadedly attached and in which it is longitudinally adjustable and further secured by means of the lock nut 29. Enclosed guide-ways 30 and 31 are mounted on the top of the engine casing 5 transversely to the movement of the piston rod and are apertured to receive the extended portions 28' of the valve stems and provide bearings therefor. Slidable traverse blocks 32 shown in enlarged detail in Fig. 6 are received within said guide-ways 30 and 31 and are provided with diagonal slots 34. Projections on the valve stem or its extension, such as pins 33, pass through the downwardly extended portions of the valve stem and through the slanted slots 34 of the said blocks. The lower parts of said blocks are furthermore cut away as shown at 35 to permit the passage of the valve stems or their extensions and also to permit lateral movement of the traverse blocks relatively thereto within the limit of their movement. The sides of the said guide-way are further cut away at 36 to give clearance for pin 37 which passes transversely through the said traverse block and is rigidly secured thereto. The hooked end 38 of a helical spring 39 is attached to said transverse pin between the upwardly extending flanges of the block and the other end is attached to bracket 41 mounted on the housing 5. A bell crank lever 45 having the arms 46 and 47 is pivoted at 48 on the engine housing. The arm 46 bears upon the projecting portion of pin 37. The upper arm 46 of the bell crank lever is held normally in contacting relation to the pin 37 by the inverted U-shaped spring 52, the loop of which rests upon arm 46 and the ends of which are rigidly attached to pivot pin 48. The lower arm 47 of said bell crank lever is in the normal pathway of the projection or lug 49 on the push rod 50 which is rigidly attached to and projects upwardly from the cross head 9.

The operation of my improvement in connection with the action of the cylinders and the other co-acting parts of the device is as follows: Assuming the parts are in the position shown in cylinder 6 as indicated by dotted lines in Fig. 2 in which the piston head is at the upper part of its stroke, the valve 27 is closed and the gas above the piston head is under compression ready for firing; that portion of the cylinder under the piston head is filled with gas which has entered through the ports 20 and 21 and whose return is blocked by the check valve 19. When the charge is fired the piston moves downwardly to a point approximately that of the dotted line $a$ as shown in Fig. 2 and just before the port 20 is disclosed. The fresh gas in the rear of the cylinder will be under high compression. At this point lug 49 on rod 50 attached to the cross head will strike arm 47 of the bell crank lever 45 and cause arm 46, which normally is in contact with pin 37 on block 32, to move the latter so that pin 33 will be raised at the other end of the slot and open the valve. The spent gases will pass through the thus fully opened port at 26 while the relief from pressure in the cylinder thereby occasioned causes the compressed fresh gases in rear of the piston head to move almost instantaneously through ports 21 and 20 into the main cylinder in front of the piston head. As the lug 49 passes arm 47 of the bell crank lever the pressure of arm 46 on pin 37 is released and spring 39 which is under tension will cause the traverse block 32 to make an almost instantaneous movement to the right thereby causing pin 33 to be depressed toward the other end of slot 34 and causing pin 37 to take the position of 37', thereby closing the valve head upon the seat 26.

It should be noted that when block 32 makes its traverse to close the valve, clearance should be provided at the rear end of the slot so that the pin or lug 33 shall not come in positive contact therewith. The action of the spring causes the traverse block to make rapid movement to a point of actual seating of the valve head and establishes a sealing contact. And as the angle of the slot face with the line of movement of the valve stem at the point at which the lug bears on said face, is at or below the angle of repose, the valve head is positively locked in its seat.

As the piston head proceeds upwardly it will compress the fresh gases in front of it and receive a fresh charge in the rear. Rod 50 will continue moving upwardly striking the lower portion of lever arm 47 and causing the bell crank lever to assume, for a moment, the position indicated by the dotted lines 45 until the lug has passed in its upper movement, whereby the lever, by the action of U-shaped spring 52, will again take its position in contact with pin 37. Said arm will contact with pin 37 in its dotted position until, after the compressed charge is fired and the piston returns to the point indicated by $a$, as above described, the lug again comes in contact with arm 47 of lever 45, the valve is opened and the cycle of operations is repeated.

I have illustrated the principles of my invention by reference to a high-speed, two-cycle, internally-fired, L-head motor. My invention however, is applicable to any form of motor or engine in which it is desired to get the quickest possible valve action, in opening and closing, and particularly to get positive mechanical action in the closing movement. By modifications which will be clear to anyone skilled in the art, the principles of my invention may be applied to other forms of gas engine such as are provided with overhead valves as well as to any type of four-cycle engine and also to steam engines.

I have shown and described the valve stem as having an extension engageable with the traverse block but in principle it is immaterial whether the stem shall be made in one or two pieces; and where in the specification or claims the valve stem or its extension is mentioned, it is to be understood as referring to either the unitary or composite structure.

I claim:

1. In an engine having a cylinder, a piston therein, a valve head and a stem therefor; a guide-way on the engine disposed transversely of the movement of the valve stem, a traverse block slidable in said guide-way and having diagonal bearing faces, projections connected to said valve stem to ride on said faces, and means actuated by the piston and timed therewith to give movement to said traverse block in one direction in said guide-way to unseat the valve, and spring means to move the traverse block in the other direction and lock the valve in its seat.

2. In an engine having a cylinder, a piston therein, a valve head and a stem therefor; a guide-way on the engine disposed transversely of the movement of the valve stem, a traverse block slidable in said guide-way and having diagonal bearing faces in the sides thereof at a low angle to its path of movement, projections connected to said valve stem to ride between said faces and means actuated by the piston and timed therewith to give lateral movement to said traverse block in said guide-way.

3. In an engine having a cylinder, a piston therein, a valve head and a stem therefor; a guide-way on the engine disposed transversely of the movement of the valve stem, a traverse block slidable in said guide-way and having diagonal bearing faces in the sides thereof at a low angle to its path of movement, projections connected to said valve stem to ride on said faces, means actuated by the piston and timed therewith to give lateral movement to said traverse block in said guide-way in one direction to open the valve, and means to give lateral movement to said traverse block in the other direction and hold it closed when said last named means is not in action.

4. In an engine having a cylinder, a piston therein, a valve head and a stem therefor; a guide-way on the engine disposed transversely of the movement of the valve stem, a traverse block slidable in said guide-way and having diagonal bearing faces, projections connected to said valve stem to ride on said faces, spring actuated means for normally moving said traverse block to valve-closing position, and means actuated by the piston and timed therewith to move said block to open said valve.

5. In an engine having a cylinder, a piston therein, a valve head, and a stem therefor; a guide-way on the engine disposed transversely of the movement of the valve stem, a traverse block slidable in said guide-way and having diagonal bearing faces, projections connected to said valve stem to ride on said faces, a bell crank lever pivoted on the engine having an arm in operative relation to said traverse block, means actuated by the piston and timed therewith to actuate said bell crank lever to open said valve and spring means to move the traverse block in the other direction and lock the valve in its seat.

6. In an engine having a cylinder, a piston therein, a valve head and a stem therefor; a guide-way on the engine disposed transversely of the movement of the valve stem, a traverse block slidable in said guide-way and having diagonal slots in the sides thereof, projections connected to said valve stem to ride in said slots, means for normally moving said traverse block and holding the valve head in its seat, a bell crank lever pivoted on the engine having an arm in operative relation to said traverse block, a cross-head moved by said piston, a rod moved by said cross-head and a lug therein adapted to engage the other arm of said bell crank lever whereby the valve is opened.

7. In an engine, the combination of a cylinder, a piston therein, an outlet valve including a valve stem having connected offset projections, a guide-way placed transversely to the movement plane of the valve stem, a traverse block in said guide-way provided with bearing faces forming guide-ways between them set diagonally to its plane of movement to receive said offset projections, and means actuated by the piston for causing longitudinal movement of the traverse block whereby said valve is opened.

8. In an engine; the combination of a cylinder, an outlet valve including a valve stem having connected offset projections, a guide-way placed transversely to the movement plane of the valve stem, a traverse block in said guide-way provided with diagonal bearing faces forming guide-ways between them placed at a low angle to its longitudinal axis to receive said offset projections, and means actuated by the piston for causing longitudinal movement of the traverse block to open said valve.

9. In an engine; the combination of a cylinder, a piston therein, an outlet valve including a valve stem having connected offset projections, a guide-way placed transversely to the movement of the valve stem, a traverse block in said guide-way provided with bearing faces set diagonally to its line of movement to receive said offset projections, the angle of said bearing faces with the line of movement of the valve stem at the contact point of said lugs being below the angle of repose, and means actuated by the piston for causing longitudinal movement of the traverse block to open said valve.

10. In a motor having a cylinder and a piston therein, an outlet valve for the said cylinder, means actuated by the piston to open the said valve, elastic means tensioned by the valve opening means for closing said valve, and positive means for locking said valve in the closed position.

11. In an engine having a cylinder, a piston therein, and a valve for said cylinder including a head and a valve stem; a traverse block moving in a plane to which said valve stem is substantially perpendicular, and mutually engaging means including cam faces placed at an angle to the movement of said valve stem to connect said valve stem and said traverse block whereby movement of the traverse block in opposite directions gives reciprocating motion to said valve.

12. In an engine having a cylinder, a piston therein, a valve including a head and a valve stem; a traverse block moving in a plane to which said valve stem is substantially perpendicular, mutually engaging means between said valve stem and said traverse block whereby movement of the traverse block in opposite directions gives reciprocating motion to said valve, automatic means for moving said traverse block to position and lock said valve head in its seat, and a device actuated by said piston to replace said automatic means in its original operative position.

13. In an engine; the combination of a cylinder having a fluid passage connected with the interior thereof, a piston in said cylinder, a valve for said passage, valve-actuating means comprising a spring, a spring-actuated locking member in movable relation to and adapted to positively lock and release said valve, and means for positively operating said spring-actuated locking member independently of said spring (or against the tension of the spring).

14. In an engine; the combination of a cylinder having a fluid passage connected with the interior thereof, a piston in said cylinder, a valve for said passage, valve-actuating means comprising a locking member in movable relation to and adapted to positively lock and release said valve, resilient means tending to actuate said locking member and thereby the valve in one direction, and means actuated by the piston and operatively connected with and adapted to actuate said locking member against the tension of said resilient means.

15. In an engine: the combination of a cylinder having a fluid passage connected with the interior thereof, a piston, a piston in said cylinder, a valve for said passage, mechanism comprising a valve stem locking device, means for mutual engagement between said locking device and the stem of said valve, and means for adjustably positioning said locking device to rigidly hold the valve head in its seat.

16. In an engine; the combination of a cylinder having a fluid passage leading to the interior thereof, a piston, a piston in said cylinder, a valve for said passage, mechanism comprising a valve stem locking device, means for mutual engagement between said locking device and the stem of said valve, means for adjustably positioning said locking device to rigidly hold the valve head in its seat, and means adapted to be actuated by the piston to release said valve and restore said positioning means to its original operative position.

17. In an engine; the combination of a cylinder having a fluid passage leading to the interior thereof, a piston in said cylinder, a valve for said passage, automatically active means for adjustably positioning and positively locking said valve in its seat, and mechanism actuated by said piston to reverse the action of said means whereby said valve is opened and said means is replaced in its original operative position.

In witness whereof, I have hereunto set my hand at Chicago in the county of Cook and State of Illinois this 8th day of September, 1922.

GEORGE W. PETERSON.